United States Patent
Yao et al.

(10) Patent No.: US 11,750,016 B2
(45) Date of Patent: Sep. 5, 2023

(54) CHARGING SYSTEM UTILIZING ENERGY STORAGE MULTIPLICATION

(71) Applicants: Guochuang Innovation Center of Mobile Energy (Jiangsu) Co., Ltd., Jiangsu (CN); Wanbang Digital Energy Co., Ltd., Jiangsu (CN); Wanbang Star Charge Technology Ltd., Jiangsu (CN)

(72) Inventors: Feng Yao, Jiangsu (CN); Xuancai Zhu, Jiangsu (CN); Yuming Zhang, Jiangsu (CN); Cheng Fu, Jiangsu (CN); Shen Chen, Jiangsu (CN)

(73) Assignees: Guochuang Innovation Center of Mobile Energy (Jiangsu) Co., Ltd., Jiangsu (CN); Wanbang Digital Energy Co., Ltd., Jiangsu (CN); Wanbang Star Charge Technology Ltd., Jiangsu (CN)

(*) Notice: Subject to any disclaimer, the term of this patent is extended or adjusted under 35 U.S.C. 154(b) by 0 days.

(21) Appl. No.: 17/737,948

(22) Filed: May 5, 2022

(65) Prior Publication Data
US 2022/0407342 A1  Dec. 22, 2022

(30) Foreign Application Priority Data
Jun. 18, 2021  (CN) .......................... 202121354027.2

(51) Int. Cl.
*H02J 7/02*  (2016.01)
*H02J 3/38*  (2006.01)
(Continued)

(52) U.S. Cl.
CPC ................ *H02J 7/02* (2013.01); *H02J 3/381* (2013.01); *H02J 7/0013* (2013.01); *H02J 7/35* (2013.01);
(Continued)

(58) Field of Classification Search
CPC ...... H02J 7/02; H02J 3/38; H02J 3/381; H02J 7/0013; H02J 7/35; H02J 2300/28; H02J 2207/20; H02J 2300/24; H02J 7/00
See application file for complete search history.

(56) References Cited

U.S. PATENT DOCUMENTS

| 2019/0052092 A1* | 2/2019 | Palombini ................. H02J 3/32 |
| 2019/0168630 A1 | 6/2019 | Mrlik et al. | |

FOREIGN PATENT DOCUMENTS

| EP | 2648304 | 10/2013 |
| EP | 3029804 | 6/2016 |

OTHER PUBLICATIONS

"Search Report of Europe Counterpart Application", dated Nov. 8, 2022, p. 1-p. 12.

* cited by examiner

*Primary Examiner* — Robert L Deberadinis
(74) *Attorney, Agent, or Firm* — JCIPRNET

(57) ABSTRACT

A charging system utilizing energy storage multiplication is provided. An energy storage battery pack of the charging system is directly connected to a DC power transmission bus. When the charging request is initiated by the charging device, the charging device takes the power from the DC bus, the AC-DC converter and DC-DC converter connected to the energy generation device work as the energy source to deliver power to the DC bus, the power goes through the DC bus to the charging device, and the rest of the power goes to the energy storage device or goes out form the energy storage device when the charring power is higher than total energy from all other converters. The high C rate discharging of the energy storage device means high power capacity during discharging, this can provide much high power than AC-DC converter to fulfill the requirement of charging device.

6 Claims, 1 Drawing Sheet

(51) Int. Cl.
    *H02J 7/00* (2006.01)
    *H02J 7/35* (2006.01)
(52) U.S. Cl.
    CPC ....... *H02J 2207/20* (2020.01); *H02J 2300/24* (2020.01); *H02J 2300/28* (2020.01)

CHARGING SYSTEM UTILIZING ENERGY STORAGE MULTIPLICATION

CROSS-REFERENCE TO RELATED APPLICATION

This application claims the priority benefit of China application serial no. 202121354027.2, filed on Jun. 18, 2021. The entirety of the above-mentioned patent application is hereby incorporated by reference herein and made a part of this specification.

BACKGROUND

Field of the Disclosure

The disclosure relates to the technical field of electric power transmission, in particular to a charging system utilizing energy storage multiplication.

Description of Related Art

With the popularity of electric vehicles, high-power charging is always one of the key features which customer concerned. However, considering the capacity of the original power grid, high-power charging requirement may beyond the grid capacity in some region such as downtown or rear area. Energy storage devices can reduce the demand for power grid capacity for charging devices, and it can be one of the key to solve the conflict between high power charming and limited AC capacity.

In the current high power charging station, new energy device, energy storage battery packs, and charging devices are mostly integrated together. Currently, in most cases, three parts are coupled on the AC or DC bus, which requires complicated energy management tools or system to keep the output power under limited, and also causes higher loss due to the additional power conversion stage in the system. Because the above energy conversions all have existing equipment, the standard practice is to directly combine existing standard equipment such as photovoltaic inverters, energy storage inverters, and high-power charging piles, or share a set of inverters for new energy and energy storage equipment. The practice has the following disadvantages:

1. There are multiple convectors, the capacity of each of the convectors will limit the overall capacity of the system, so it is necessary to design according to the maximum capacity, which will inevitably increase the cost, and is accompanied by a relatively large loss. Because the system is complicated, the chance of failure is increased.

2. For the overall system, there are AC transmission lines to connect the electrical grid and the charging devices and DC transmission lines to connect the new energy device and the energy storage battery system. There are many transmission lines, so the cost of erecting lines is high.

3. There are many DC-AC convertors connected in series, which involves droop control, so the control is complicated and the system has relatively poor robustness.

SUMMARY OF THE DISCLOSURE

In order to solve the above-mentioned problems, the present disclosure provides a charging system utilizing energy storage multiplication. This system only needs an AC-DC converter with a smaller power, and by adjusting the ratio of the capacity of the AC-DC converter to other energy sources according to the specific conditions of the various energy sources on site, the maximum capacity of the power system can be achieved. There is no need to design various converters according to the maximum capacity, which may reduce the overall cost. The energy storage battery is directly connected to the DC power transmission bus, and by the battery characterized in slow charging and fast discharging, it can be directly configured with the charging device with the maximum capacity to maximize the use of battery performance. In the entire system, only DC transmission lines need to be arranged, and the new energy, the energy storage battery system and the charging device may be connected into one system, thereby saving the cost of configuring lines. The new energy and energy storage battery do not need to incorporate energy into the power grid and transform the energy to be transmitted to the charging device, thereby saving the energy loss in the indirect transmission process. Since the energy storage system itself has voltage regulation characteristics, the DC bus does not need voltage stability control, which simplifies system control and improves system stability.

The technical solution adopted in the present disclosure is as follows.

An embodiment in the first aspect of the present disclosure provides a charging system utilizing energy storage multiplication. The charging system utilizing energy storage multiplication includes a distribution grid, an AC-DC converter, a DC power transmission bus, an energy storage battery pack, and a first DC-DC converter. The AC side of the AC-DC converter is directly or indirectly connected to the distribution grid, and the AC-DC converter is configured to invert an AC voltage into a first DC voltage. The DC power transmission bus is connected to a DC side of the AC-DC converter. The energy storage battery pack is connected to the DC power transmission bus. The energy storage battery pack is able to operate in a charging mode and a discharging mode. When the energy storage battery pack operates in the charging mode, the first DC voltage obtained from the DC power transmission bus is stored. When the energy storage battery pack operates in the discharging mode, the energy storage battery pack outputs the first DC voltage to the DC power transmission bus. One side of the first DC-DC converter is connected to the DC power transmission bus, and another side of the first DC-DC converter is connected to a charging device. The first DC-DC converter is configured to convert the first DC voltage on the DC power transmission bus into a preset DC power, so as to charge the charging device.

The abovementioned charging system utilizing energy storage multiplication further has the following additional technical features.

Specifically, when the AC side of the AC-DC converter is indirectly connected to the distribution grid, the charging system further comprising a transformer, wherein one side of the transformer is connected to the distribution grid, and another side of the transformer is connected to the AC side of the AC-DC converter, and the transformer is configured to convert a first AC voltage at a side of the distribution grid into a second AC voltage.

Specifically, the charging system further comprises an energy generation device. The energy generation device is connected to the DC power transmission bus through a second DC-DC converter, and the second DC-DC converter is configured to convert a second DC voltage output from the energy generation device into the first DC voltage and transmit the first DC voltage to the DC power transmission bus.

Specifically, the AC-DC converter is a bidirectional AC-DC converter.

Specifically, the energy generation device comprises one or more of a solar energy device, a wind energy device, and a photovoltaic device.

Specifically, the energy storage battery pack comprises a plurality of single cells or battery modules connected in series and/or in parallel.

Specifically, the first DC-DC converter is at least one in number, and when the number of the first DC-DC converter is two or more, the first DC-DC converters are connected in parallel with each other.

The present disclosure has the following advantages.

(1) The above-mentioned charging system using energy storage multiplication only needs an AC-DC converter with a small power, and the ratio of the capacity of the AC-DC converter to other energy sources may be adjusted according to the specific conditions of the various energy sources on site, thereby realizing the maximum capacity of the power system. There is no need to design various converters according to the maximum capacity, which may reduce the overall cost.

(2) The energy storage battery is directly connected to the DC power transmission bus, and the battery characterized in slow charging and fast discharging may be directly configured with the charging device with the maximum capacity, so as to maximize the use of battery performance.

(3) In the entire system, only DC transmission lines need to be arranged, and the new energy, the energy storage battery system and the charging device may be connected into one system, saving the cost of configuring lines.

(4) The new energy and energy storage battery do not need to incorporate energy into the power grid and transform the energy to be transmitted to the charging device, thus saving the energy loss in the indirect transmission process.

(5) Since the energy storage system itself has voltage regulation characteristics, the DC bus does not need voltage stability control, which simplifies system control and improves system stability.

DESCRIPTION OF EMBODIMENTS

The technical solutions in the embodiments of the present disclosure will be clearly and completely described below with reference to the accompanying drawings in the embodiments of the present disclosure. Clearly, the described embodiments are only a part of the embodiments of the present disclosure, rather than all the embodiments. Based on the embodiments of the present disclosure, all other embodiments obtained by those of ordinary skill in the art without creative efforts shall fall within the scope to be protected by the present disclosure.

Figure 1:
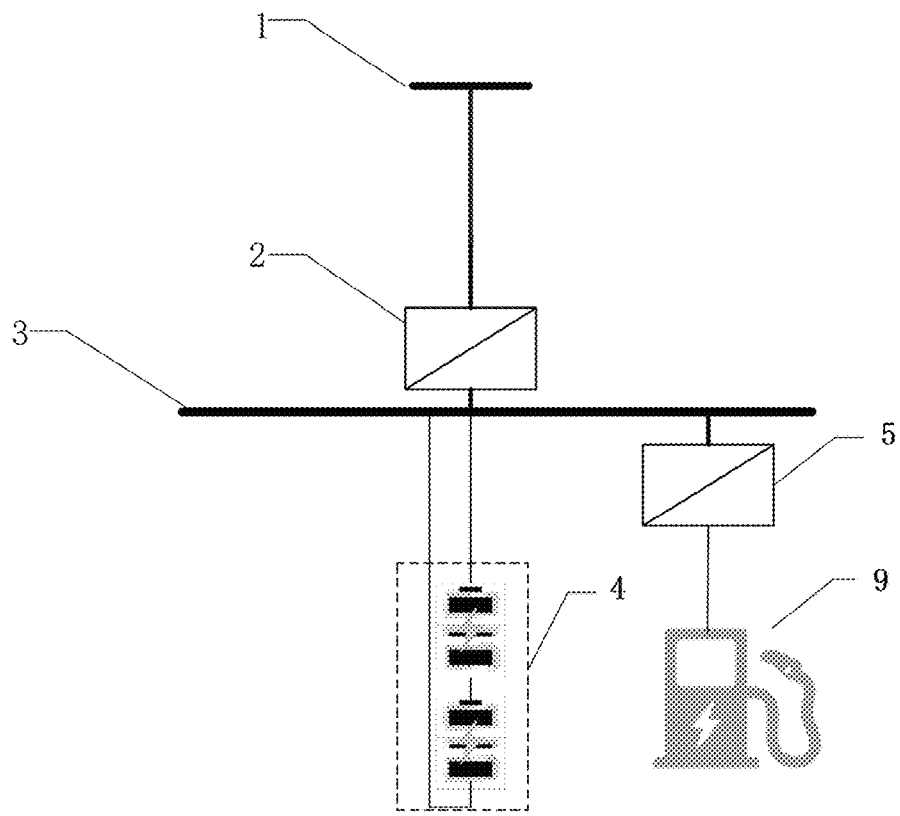
FIG. 1 is a schematic structural view of a charging system utilizing energy storage multiplication according to an embodiment of the present disclosure.

FIG. 1 is a schematic structural view of a charging system utilizing energy storage multiplication according to an embodiment of the present disclosure. As shown in FIG. 1, the system includes a distribution grid 1, an AC-DC converter 2, a DC power transmission bus 3, and an energy storage battery pack 4, and a first DC-DC converter 5.

The AC side of the AC-DC converter 2 is directly or indirectly connected to the distribution grid 1, and the AC-DC converter 2 is configured to invert the AC voltage into the first DC voltage. The DC power transmission bus 3 is connected to DC side of the AC-DC converter 2. The energy storage battery pack 4 is connected to the DC power transmission bus 3, and the energy storage battery pack 4 can operate in the charging mode and the discharging mode. When the energy storage battery pack 4 operates in the charging mode, the first DC voltage obtained from the DC power transmission bus 3 is stored. When the energy storage battery pack 4 operates in the discharging mode, the energy storage battery pack 4 outputs the first DC voltage to the DC power transmission bus 3. One side of the first DC-DC converter 5 is connected to the DC power transmission bus 3. Another side of the first DC-DC converter 5 is connected to the charging device 9, and the first DC-DC converter 5 is configured to convert the first DC voltage on the DC power transmission bus 3 into a preset DC power, so as to charge the charging device 9.

Figure 2:
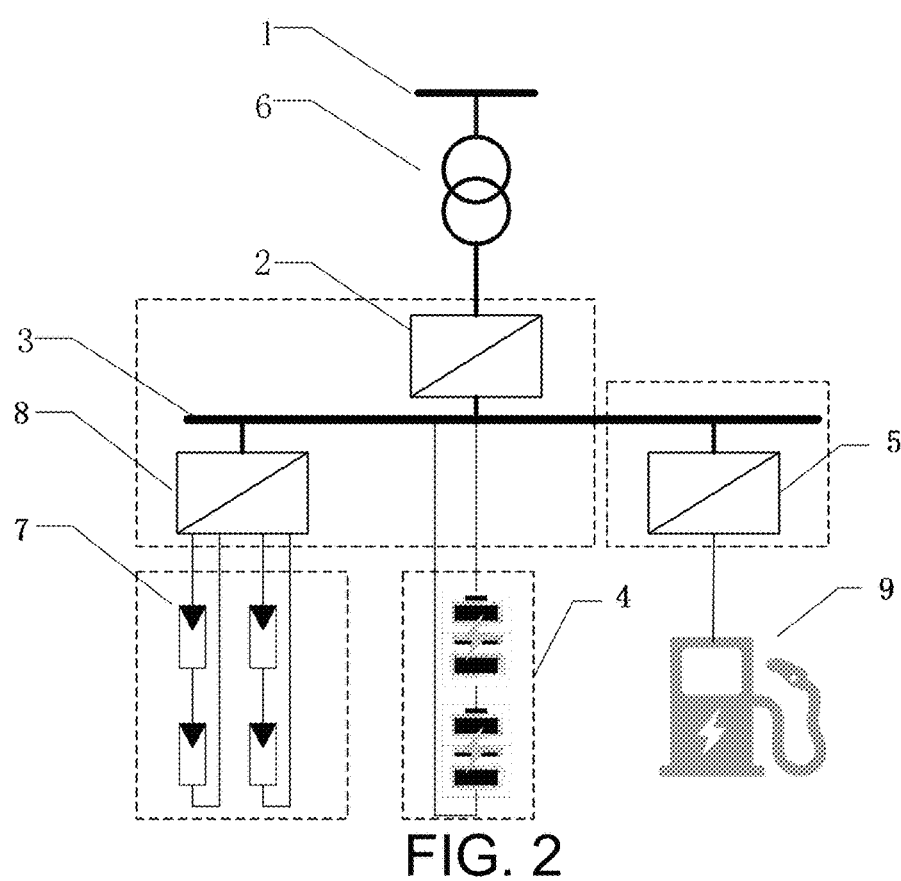
FIG. 2 is a schematic structural view of a charging system utilizing energy storage multiplication according to an embodiment of the present disclosure.

In an embodiment of the present disclosure, as shown in FIG. 2, when the AC side of the AC-DC converter is indirectly connected to the distribution grid, the charging system further includes a transformer 6. One side of the transformer 6 is connected to the distribution grid 1, and another side of the transformer 6 is connected to the AC side of the AC-DC converter 2. The transformer 6 is configured to convert a first AC voltage at a side of the distribution grid 1 into a second AC voltage. The ratio of the first AC voltage to the second AC voltage is determined by the transformation ratio of the transformer 6.

In an embodiment of the present disclosure, as shown in FIG. 2, the abovementioned charging system utilizing energy storage multiplication may further includes an energy generation device 7. The energy generation device 7 is connected to the DC power transmission bus 3 through a second DC-DC converter 8, and the second DC-DC converter 8 is configured to convert a second DC voltage output from the energy generation device 7 into the first DC voltage and transmit the first DC voltage to the DC power transmission bus 3.

In an embodiment of the present disclosure, the AC-DC converter 2 may be a bidirectional AC-DC converter, that is, the AC-DC converter 2 may invert the AC voltage into the first DC voltage and output the first DC voltage to the DC power transmission bus 3. The first DC voltage on the DC power transmission bus 3 may also be converted into an AC voltage and be transmitted to the distribution grid.

Specifically, the power source of the energy storage battery pack 4 is the DC power transmission bus 3, and the power source of the DC power transmission bus 3 may be the distribution grid 1 or the energy generation device 7. That is, the distribution grid 1-transformer 6-AC-DC converter 2-DC power transmission bus 3, energy generation device 7-second DC-DC converter 8-DC power transmission bus 3. When the power storage of the energy storage battery 4 is full, the power (second DC voltage) output by the energy generation device 7 may be transmitted to the distribution grid 1 through the second DC-DC converter 8-DC power transmission bus 3-AC-DC converter 6. The capacity of the charging device 9 is several times the capacity of the AC-DC converter 2, and the charging power may be multiplied by the energy storage battery pack 4 directly coupled to the DC power transmission bus 3.

The energy storage battery pack 4 is directly coupled to the DC power transmission bus 3 without undergoing power conversion. When the charging device 9 is charged, the power source includes the distribution grid 1, the energy storage battery pack 4 and the energy generation device 7, and the energy generation device 7 is preferentially selected for power supply. If the power required by the energy generation device 7 is greater than the power delivered by the energy generation device 7, the energy storage battery pack 4 is selected for power supply. If the power of the energy storage battery pack 4 is exhausted, the distribution grid 1 is selected for power supply. As a result, while the charging demand of the charging device is ensured, the loading on the power grid can be relieved, and the energy generation device is preferentially selected to supply power, which satisfies sustainable development and promotes the development of the new energy industry.

In the present disclosure, the energy generation device 7 may include one or more of solar energy device, wind energy device, photovoltaic device, and the like. The energy storage battery pack 4 may include a plurality of single cells or battery modules connected in series and/or in parallel.

In an embodiment of the present disclosure, the first DC-DC converter 5 is at least one in number (in FIG. 1 and FIG. 2, one first DC-DC converter 5 is taken as an example), and when the number of the first DC-DC converter 5 is two or more, the first DC-DC converters are connected in parallel with each other, to realize port power supply function at the same time.

It can be understood that the charging device 9 is a device that needs to be charged, such as an electric vehicle, and a preset DC power may be delivered to the charging device through a high-power charging gun or a DC charging gun.

The above-mentioned charging system using energy storage multiplication only needs an AC-DC converter with a small power, and the ratio of the capacity of the AC-DC converter to other energy sources may be adjusted according to the specific conditions of the various energy sources on site, thereby realizing the maximum capacity of the power system. There is no need to design various converters according to the maximum capacity, which may reduce the overall cost. The energy storage battery is directly connected to the DC power transmission bus, and the battery characterized in slow charging and fast discharging may be directly configured with the charging device with the maximum capacity, so as to maximize the use of battery performance. In the entire system, only DC transmission lines need to be arranged, and the new energy, the energy storage battery system and the charging device may be connected into one system, saving the cost of configuring lines. The new energy and energy storage battery do not need to incorporate energy into the power grid and transform the energy to be transmitted to the charging device, thus saving the energy loss in the indirect transmission process. Since the energy storage system itself has voltage regulation characteristics, the DC bus does not need voltage stability control, which simplifies system control and improves system stability.

In the description of the present disclosure, it should be understood that, unless otherwise expressly specified and limited, the terms "installed", "connected", "connection", "fixed" and other terms should be understood in a broad sense. For example, it can be fixedly connected, and can also be detachably connected or formed as one piece. It can be mechanically connected, and can also be electrically connected. It can be directly connected, and can also be connected through an intermediate medium. It can be two components internally communicated or two components interacted with each other. Unless explicitly defined, for those of ordinary skill in the art, the specific meanings of the above terms in the present invention can be understood according to specific situations.

In the description of the present disclosure, description with reference to the terms "one embodiment," "some embodiments," "example," "specific example," or "some examples", etc., mean that specific features, structures, materials or characteristics described in connection with the embodiment or example are included in at least one embodiment or example of the present disclosure. In the specification, schematic expression of the above terms are not necessarily directed to the same embodiment or example. Furthermore, the specific features, structures, materials or characteristics described herein may be combined in any suitable manner in any one or more embodiments or examples. Moreover, those skilled in the art may combine and merge the different embodiments or examples described in this specification, as well as the features of the different embodiments or examples under the premise where there is no conflict between the features and embodiments.

Although the embodiments of the present disclosure have been shown and described above, it should be understood that the above embodiments are exemplary and should not be construed as limitation to the present disclosure. Variations, modifications, substitutions and deformations may be made to the embodiments by those of ordinary skill in the art within the scope to be protected by the disclosure.

What is claimed is:

1. A charging system utilizing energy storage multiplication, the charging system comprising:
   a distribution grid;
   an AC-DC converter, wherein an AC side of the AC-DC converter is directly or indirectly connected to the distribution grid, and the AC-DC converter is configured to invert an AC voltage into a first DC voltage;
   a DC power transmission bus, wherein the DC power transmission bus is connected to a DC side of the AC-DC converter;
   an energy storage battery pack, wherein the energy storage battery pack is connected to the DC power transmission bus, and the energy storage battery pack is able to operate in a charging mode and a discharging mode, when the energy storage battery pack operates in the charging mode, the first DC voltage obtained from the DC power transmission bus is stored, when the energy storage battery pack operates in the discharging mode, the energy storage battery pack outputs the first DC voltage to the DC power transmission bus; and
   a first DC-DC converter, wherein one side of the first DC-DC converter is connected to the DC power transmission bus, another side of the first DC-DC converter is connected to a charging device, and the first DC-DC converter is configured to convert the first DC voltage on the DC power transmission bus into a preset DC power, so as to charge the charging device,
   the charging system further comprising an energy generation device, wherein the energy generation device is connected to the DC power transmission bus through a second DC-DC converter, and the second DC-DC converter is configured to convert a second DC voltage output from the energy generation device into the first DC voltage and transmit the first DC voltage to the DC power transmission bus,
   in response to a power required by the energy generation device being greater than a power delivered by the energy generation device, the energy storage battery pack is configured to supply power to the DC power transmission bus, in response to a power of the energy storage battery pack being exhausted, the distribution grid is configured to supply power to the DC power transmission bus.

2. The charging system utilizing energy storage multiplication according to claim 1, wherein when the AC side of the AC-DC converter is indirectly connected to the distribution grid, the charging system further comprising a transformer, wherein one side of the transformer is connected to the distribution grid, and another side of the transformer is connected to the AC side of the AC-DC converter, and the transformer is configured to convert a first AC voltage at a side of the distribution grid into a second AC voltage.

3. The charging system utilizing energy storage multiplication according to claim 1, wherein the AC-DC converter is a bidirectional AC-DC converter.

4. The charging system utilizing energy storage multiplication according to claim 1, wherein the energy generation device comprises one or more of a solar energy device, a wind energy device, and a photovoltaic device.

5. The charging system utilizing energy storage multiplication according to claim 1, wherein the energy storage battery pack comprises a plurality of single cells or battery modules connected in series and/or in parallel.

6. The charging system utilizing energy storage multiplication according to claim 1, the first DC-DC converter is at least one in number, and when the number of the first DC-DC converter is two or more, the first DC-DC converters are connected in parallel with each other.

\* \* \* \* \*